(12) United States Patent
Bender et al.

(10) Patent No.: US 10,757,178 B2
(45) Date of Patent: Aug. 25, 2020

(54) AUTOMATED ETL RESOURCE PROVISIONER

(71) Applicant: INTERNATIONAL BUSINESS MACHINES CORPORATION, Armonk, NY (US)

(72) Inventors: Michael Bender, Rye Brook, NY (US); David E. Nachman, Morristown, NJ (US); Michael P. Shute, Niantic, CT (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/900,993

(22) Filed: Feb. 21, 2018

(65) Prior Publication Data

US 2018/0183864 A1 Jun. 28, 2018

Related U.S. Application Data

(62) Division of application No. 14/878,317, filed on Oct. 8, 2015.

(51) Int. Cl.
| H04L 29/08 | (2006.01) |
| H04L 12/919 | (2013.01) |
| H04L 12/24 | (2006.01) |

(52) U.S. Cl.
CPC ...... *H04L 67/1008* (2013.01); *H04L 41/5054* (2013.01); *H04L 47/765* (2013.01); *H04L 41/024* (2013.01)

(58) Field of Classification Search
CPC .......................... H04L 41/024; G06F 17/30563
(Continued)

(56) References Cited

U.S. PATENT DOCUMENTS 8,515,898 B2    8/2013   Bhide et al.
9,479,382 B1 *  10/2016  Ward, Jr. ............... H04L 29/06
(Continued)

FOREIGN PATENT DOCUMENTS

| CN | 103366312 A | 10/2013 |
| CN | 103488537 A | 1/2014 |

OTHER PUBLICATIONS

Fang et al, An Integrated System for Regional Environmental Monitoring and Management Based on Internet of Things, IEEE Transactions on Industrial Informatics, vol. 10, No. 2, 2014.
(Continued)

*Primary Examiner* — Tonia L Dollinger
*Assistant Examiner* — Jonathan A Sparks
(74) *Attorney, Agent, or Firm* — Patrick J. Daugherty; Daugherty & Del Zoppo Co., LPA

(57) ABSTRACT

Aspects automatically provisioning of cloud resources for ETL job execution as a function of optimizer output data. Access paths identify overall cost and individual step operator costs and statistics relative to cloud resources for executing an SQL commands against a relational database. In one aspect operator steps having high step costs are identified and amounts, types or speeds of a cloud resources associated with the step are adjusted to thereby reduce the step cost and the access path overall cost. In another aspect SQL text descriptors and step costs and function statistics are compared to knowledge base criteria for matches to criteria associated inefficient configurations cloud resources for revision to improve corresponding operation efficiency. In another aspect usages of cloud resources by operator steps are monitored and logged and compared to historic data of similar steps to determine under or over-utilization of resources.

13 Claims, 5 Drawing Sheets

(58) Field of Classification Search
USPC .......................................................... 370/474
See application file for complete search history.

(56) References Cited

U.S. PATENT DOCUMENTS

| | | | | |
|---|---|---|---|---|
| 10,417,593 | B1* | 9/2019 | Norbeck, Jr. | ....... G06F 16/3328 |
| 2009/0106320 | A1* | 4/2009 | Dageville | ......... G06F 16/24542 |
| 2011/0010358 | A1* | 1/2011 | Zane | ...................... G16H 50/70 |
| | | | | 707/714 |
| 2012/0173717 | A1* | 7/2012 | Kohli | .................. G06F 11/3006 |
| | | | | 709/224 |
| 2012/0330926 | A1* | 12/2012 | Rajan | ................ G06F 16/24542 |
| | | | | 707/718 |
| 2013/0297557 | A1 | 11/2013 | Bhide et al. | |
| 2013/0332484 | A1 | 12/2013 | Gajic et al. | |
| 2014/0180961 | A1* | 6/2014 | Hankins | ............. G06Q 10/0637 |
| | | | | 705/348 |
| 2014/0317617 | A1 | 10/2014 | O'Donnell et al. | |
| 2017/0032016 | A1* | 2/2017 | Zinner | ................ G06Q 10/063 |

OTHER PUBLICATIONS

Disclosed Anonymously, Optimizing of workload of ETL jobs based on resource availability on dependent Source, Target and ETL Infrastructure,IP.com Electronic Publication 000230005, 2013.

Disclosed Anonymously, System and Methods to Dynamically create ETL processes, execute them remotely and consume its report in alternate process(es), IP.com Electronic Publication No. 000222901, 2012.

Mai et al, Exploiting Time-Malleability in Cloud-based Batch Processing Systems, Workshop on Large-Scale Distributed Systems and Middleware (LADIS'13), ACM, 2013.

Powley et al, Resource Aware Workload Management for Autonomic Database Management Systems, ICAS 2014, The Tenth International Conference on Autonomic and Autonomous Systems, IARRIA, 2014.

Yang et al, ETL Pipeline Resource Predictions in Distributed Data Warehouses, Association for Information Systems, AIS Electronic Library (AISeL), SAIS 2011 Proceedings, 2011.

Zhao et al, An Optimization Scheme for Bank Batch Processing Based on Cloud Computation, Applied Mechanics and Materials, Advanced Engineering Solutions (/AMM.539), http://www.scientific.net/AMM.539.339, 2014.

Peter Mell et al, The NIST Definition of Cloud Computing, National Institute of Standards and Technology, U.S. Department of Commerce, Special Publication 800-145, 2011.

U.S. Appl. No. 14/878,317, filed Oct. 8, 2015.

* cited by examiner

AUTOMATED ETL RESOURCE PROVISIONER

BACKGROUND

Public and private sector users and organizations generate large amounts of information data items and objects that are amenable to Extract, Transform and Load (ETL) transactions to process, understand and otherwise utilize the underlying information. ETL refers to a process in database usage and especially in data warehousing that "extracts" data from homogeneous or heterogeneous data sources, "transforms" the data for storing it in a specified or desired format or structure for querying and analysis purposes, and "loads" the transformed data onto a designated target database destination, such as an operational data storage device (a "store"), a data warehouse, a data mart, etc. Data extraction may be time intensive, and accordingly some implementations perform (execute) all three ETL phases in parallel with respect to different data items, enabling resource and time efficiencies.

ETL systems may integrate data from multiple, different applications or systems, which may be developed and supported by different entities or organizations, and hosted on separate computer hardware components and networks. Disparate systems containing original data may thereby be managed and operated by different users, for example a cost accounting system may combine data from payroll, sales and purchasing systems.

ETL processes may experience a wide variety of workload demands, each calling for different amounts and types of computing resources. Problems arise in efficiently deploying cloud models to meet demands for variable workloads, wherein the required amounts of resources needed to execute large job runs may be easily procured, and then altered (stopped, etc.) as needed for other, smaller job runs.

Prior art ETL workload management techniques generally require operators to revise job configurations and scheduling to allocate appropriate resources manually, or through some fixed programmatic method such as in a scripted scenario, where additional servers are provisioned through an API before job execution, and then de-provisioned after execution. One prior art approach is discussed by "Exploiting Time-Malleability in Cloud-Based Batch Processing Systems" (Luo Mai, Evangelia Kalyvianaki, and Paolo Costa, Workshop on Large-Scale Distributed Systems and Middleware (LADIS'13), ACM, November 2013), wherein the scheduling of jobs that are "time-malleable" are changed to correspond to times or greater resource availability as a function of a pricing model wherein the later a job is completed, the lower rate a user pays. To avoid unbounded completion time users may also specify the longest acceptable deadline of completion of the jobs and a maximum price they are willing to pay.

"An Optimization Scheme for Bank Batch Processing Based on Cloud Computation" (X. Zhao, G. M. Li, Applied Mechanics and Materials, Vol. 539, pp. 339-344, July 2014) teaches batch processing optimization schemes that divide a business process job into parallel and independent tasks to which IT resources are differentially allocated.

"Resource Aware Workload Management for Autonomic Database Management Systems" (by Wendy Powley, Patrick Martin, Natalie Gruska, Paul Bird and David Kalmuk, ICAS 2014: The Tenth International Conference on Autonomic and Autonomous Systems, IARIA, April 2014) teaches a "resource aware" scheduling approach that schedules queries to run only when doing so is unlikely to overwhelm identified CPU, I/O and sort heap memory resources.

However, changing job schedules and parameters in order to conform to known cloud environments does not indicate or enable the revision of cloud resource deployments. This results in inefficiencies and high execution costs, as job scheduling and reallocations may not have a significant impact on resource efficiency and cost savings in all cloud resource configurations.

BRIEF SUMMARY

Aspects of the present invention provide advantages over prior art techniques by automating the provisioning and de-provisioning of ETL cloud resources based on the characteristics of execution of an ETL job, rather than changing job specifications on individual bases in order to conform to a specific cloud resource configuration. Aspects optimize the environment, not the schedule, via the flexible and dynamic reallocation of cloud resources on a job-dependent basis. This enables a given set of cloud resources to offer multiple job execution configurations that each have different efficiencies and advantages for different job characteristics.

More particularly, in one aspect of the present invention, a first method for automated provisioning of cloud resources for ETL job execution as a function of optimizer output data includes executing on a processor a step of generating an access path that identifies an overall cost to cloud resources that are specified as available to execute an input structured English query language (SQL) command for performance against a relational database. The generated access path includes operator steps that are performed to carry out the SQL command, wherein each of the steps indicate, as a function of the specified available cloud resources, an associated database operator command, a step cost and one or more other step function statistics. In response to the overall cost exceeding an upper threshold cost value for execution of the SQL statement input, one or more of the operator steps are identified that have step costs that are higher than expected for their respective operators. Thus, an amount, type or speed of a cloud resource that is associated with said identified step(s) is adjusted to thereby reduce the step cost and the overall cost of a revised access path generated in response to the SQL command input, as a function of cloud resources specified as available to execute the SQL command against the relational database, and wherein the associated cloud resource is a CPU, a memory or a storage device of the available cloud resources.

In another aspect of the present invention, a second method for automated provisioning of cloud resources for ETL job execution as a function of optimizer output data includes executing on a processor a step of generating an access path that identifies an overall cost to cloud resources that are specified as available to execute the SQL command against the relational database in response to a SQL command input for performance against a relational database. The access path includes operator steps that are performed to carry out the SQL command, wherein each of the steps indicates, as a function of the passed values of available cloud resources, an associated database operator command and a step cost and a step function statistic. A text descriptor of SQL command input, and the step costs and step function statistics of the access path operator steps are compared to criteria within a knowledge base library for matches, wherein matching criteria within the knowledge base library are associated with inefficient configurations of the cloud resources. In response to a match of the criteria within the knowledge base library to the text descriptor, or to a step cost or step function statistic of a first step of the operator steps, passed values of the available cloud resources are revised to values associated with the matched criteria and indicated to improve efficiency of an operation corresponding to the first operator step by lowering the step cost of the first step or revising a matching step function statistic of the first step. In this second method the passed values of the available cloud resources are amounts, types or speeds of CPUs, memories or storage devices of the cloud resources.

In another aspect of the present invention, a third method for automated provisioning of cloud resources for ETL job execution as a function of optimizer output data includes executing on a processor a step of monitoring operator steps carried out to accomplish an ETL SQL command job for respective usages of available resources during their performance. The available resources include one or more of CPU, memory, storage and input/output device resources. Usage data is logged in association with respective ones of the operator steps that generate the logged usage. The logged usage data is compared to historic data for similar steps to determine under- or over-utilization of the resources for each of the steps as a function of amounts of differences in values of the compared data relative to the historic data for the similar steps. Thus, an operating environment is optimized for subsequent executions of the monitored plurality of operator steps by adjusting an amount, type or speed of CPUs, memories or storage devices of cloud resources that are associated with the operator steps to correspondingly reduce the amounts of differences in values of the compared data relative to the historic data for the similar steps.

Optional methods also provide services wherein computer-readable program code is integrated with computer systems including processors executing method steps described above, which are in circuit communication with computer readable memory and a computer readable storage medium. The computer readable program code in said optional methods includes instructions for execution by a processor that cause the processor to perform method steps of the first, the second or the third method described above.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby performs the steps described above with respect to the first method.

In another aspect, a computer program product for the automated provisioning of cloud resources for ETL job execution as a function of optimizer output data has a computer-readable storage medium with computer readable program code embodied therewith. The computer readable hardware medium is not a transitory signal per se. The computer readable program code includes instructions for execution by a processor that cause the processor to performs the steps described above with respect to the second method.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
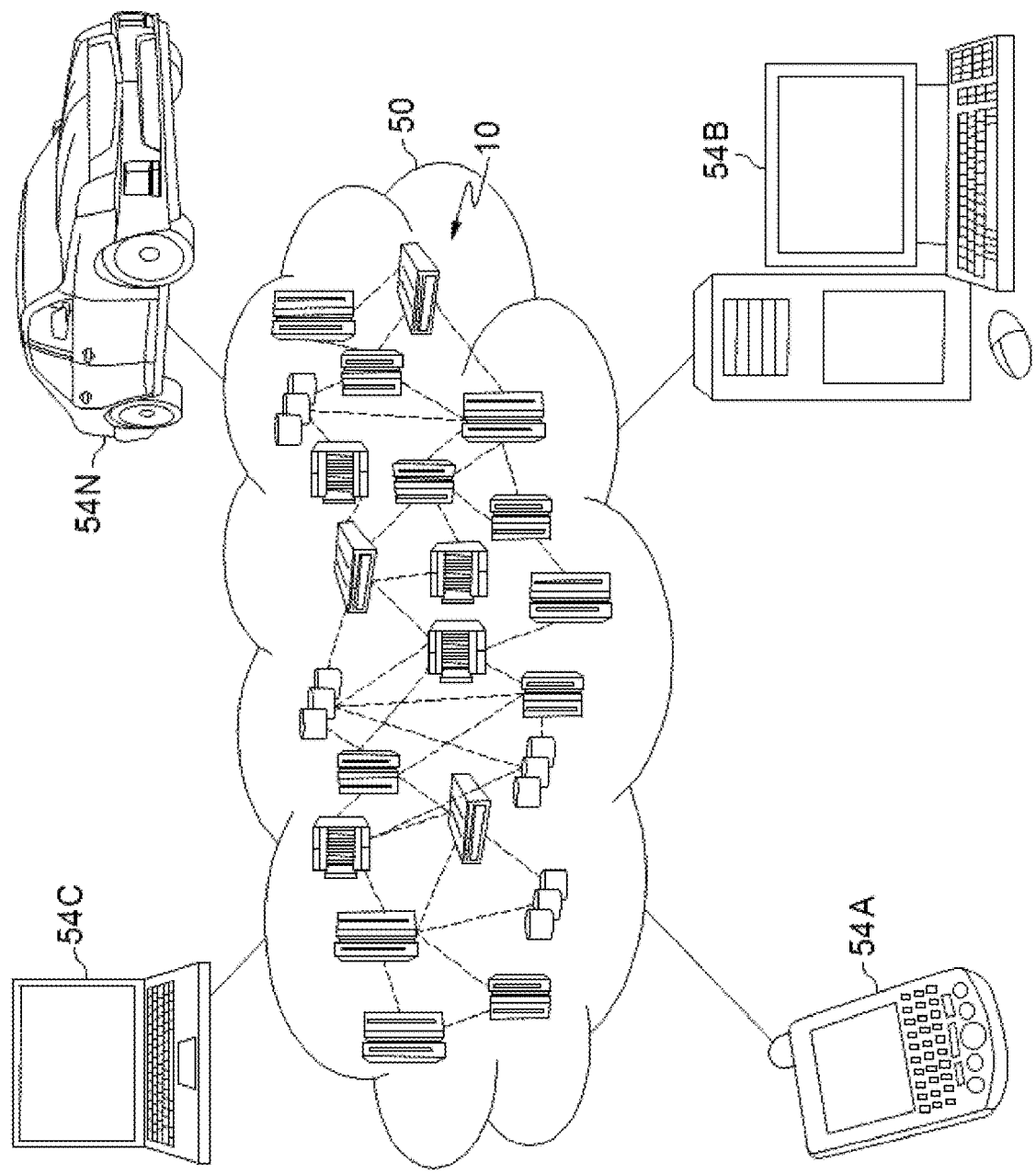
FIG. 1 depicts a cloud computing node according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
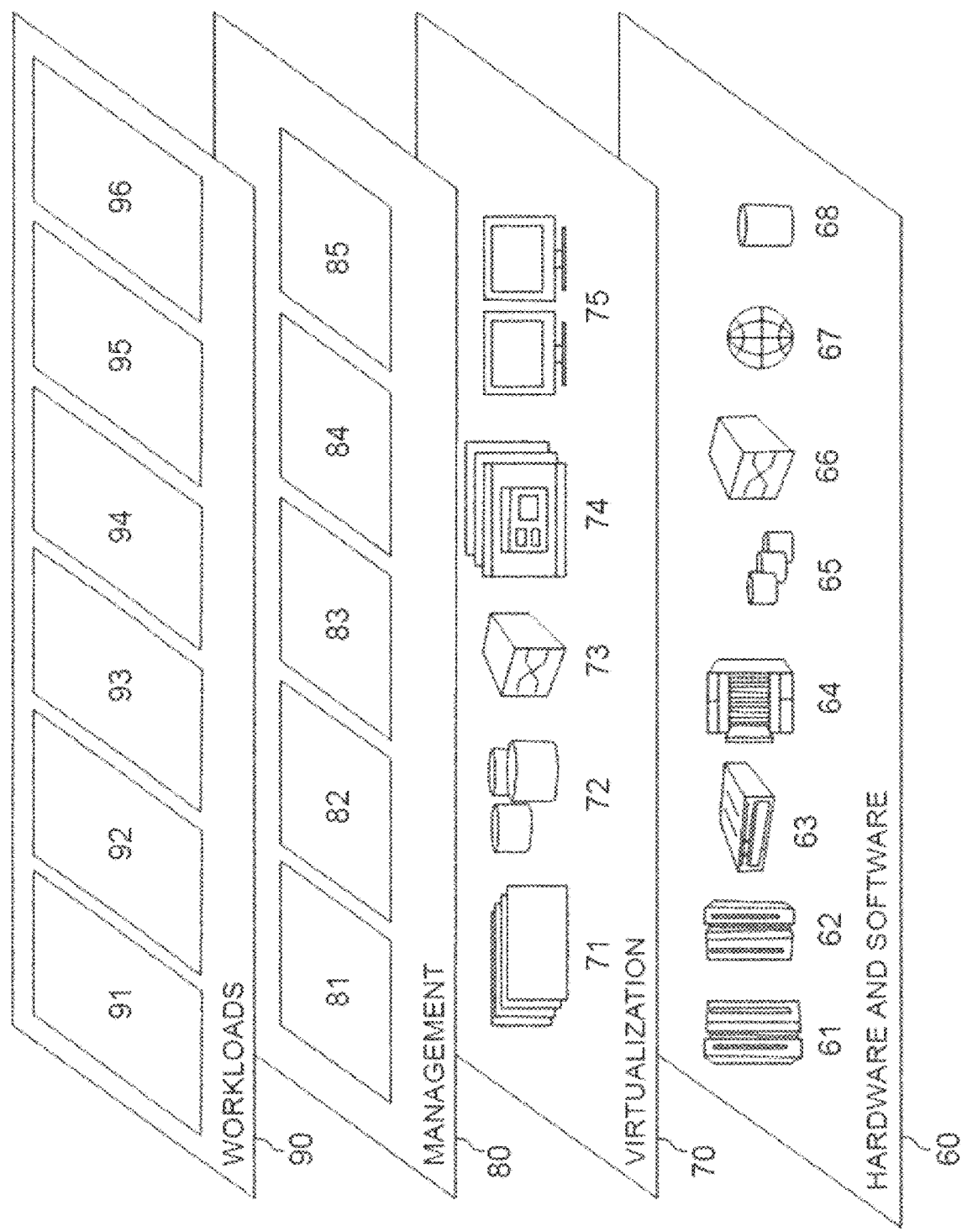
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for the automated provisioning of cloud resources for ETL job execution as a function of optimizer output data as described below.

Figure 3:
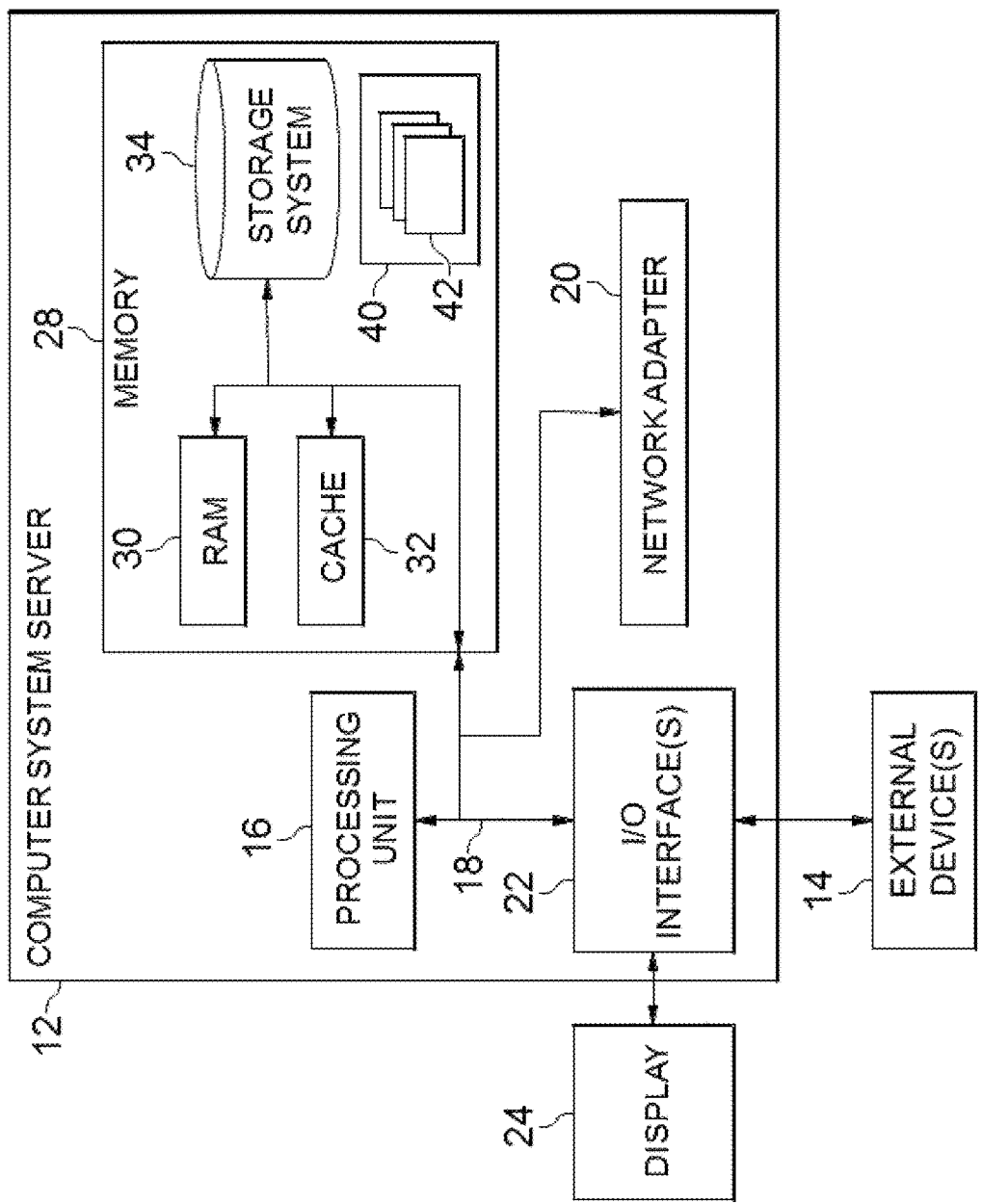
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Aspects of the present invention provide advantages over prior art techniques by automating the provisioning and de-provisioning of ETL cloud resources based on the characteristics of execution of an ETL job, rather than changing job specifications on individual bases in order to conform to a specific cloud resource configuration. Aspects optimize the environment, not the schedule, via the flexible and dynamic reallocation of cloud resources on a job-dependent basis. This enables a given set of cloud resources to offer multiple job execution configurations that each have different efficiencies and advantages for different job characteristics.

Figure 4:
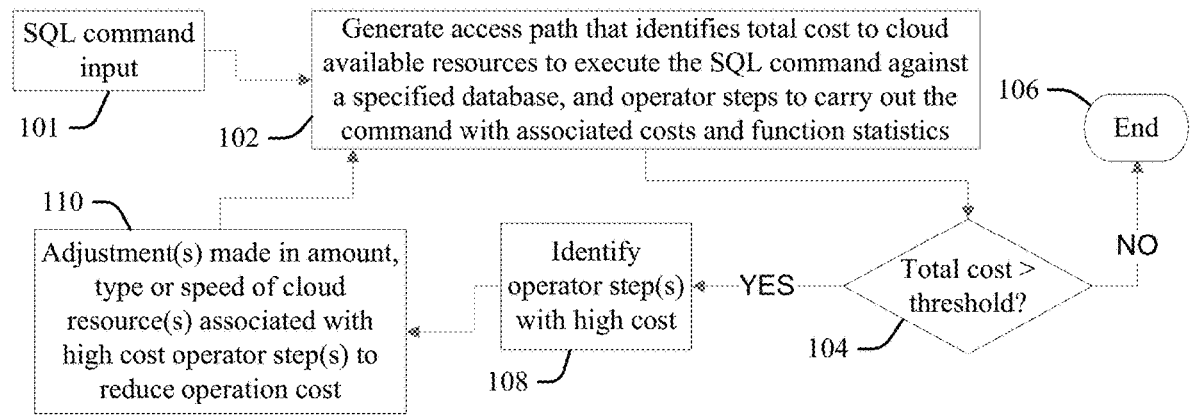
FIG. 4 is a flow chart illustration of a method or process according to an aspect of the present invention for the automated provisioning of cloud resources for ETL job execution as a function of optimizer output data.

For example, FIG. 4 (or "FIG. 4") illustrates a computer implemented method or process of an aspect of the present invention for the automated provisioning of cloud resources for ETL job execution as a function of optimizer output data. A processor (for example, a central processing unit (CPU)) executes code, such as code installed on a storage device in communication with the processor, and thereby performs the process step elements illustrated in FIG. 4.

At 102, in response to a Structured English Query Language ("SQL") command input 101 of an ETL job that is to be performed at some point in the future against a relational database, an optimizer program executing on the processor generates an access path that identifies an overall cost to cloud resources that are specified as available to execute the SQL command against a specified database, and a plurality of operator steps that are performed to carry out the command, wherein each step indicates an associated database operator command and cost and other function statistics as a function of the specified resources (amount, type or speed of CPU, memory, or storage). The costs and statistics are generated as a function of executing the operator steps on tables, indexes, or columns of the database, relative to properties of the operators, global resource information (table space), and other configuration parameters relevant to executing the SQL command against the specified database.

Figure 5:
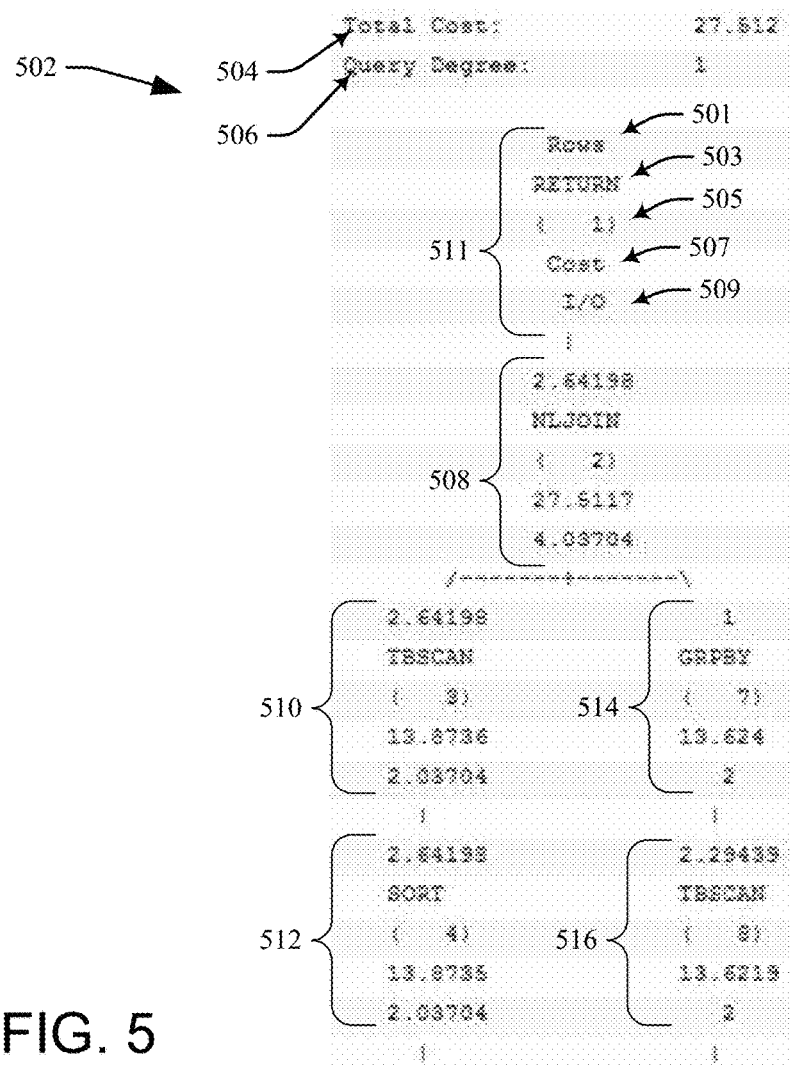
FIG. 5 is a graphic illustration of one example of an access path generated according to the present invention.

FIG. 5 is a graphic illustration of one example of a portion 502 of an access path generated at 102 by a Visual Explain optimizer in a DB2® SQL environment, though other aspects may be configured to process other database commands. (DB2 is a trademark of International Business Machines Corporation in the United States or other countries.) DB2 is common server product that is designed with a common code base to run on different platforms, and supports a relational model as well as object-relational features and non-relational structures such as JavaScript™ Object Notation (JSON) and Extensible Mark-up Language (XML). (JAVA and all JAVA-based trademarks and logos are trademarks or registered trademarks of Oracle and/or its affiliates in the United States or other countries.)

As indicated in FIG. 5, a total cost 504 determined for the SQL command (at 102 of FIG. 4) is "27.512." This value is in "timerons," a unit of cost that does not directly equate to actual elapsed time, but gives a rough relative estimate of the total resources (cost) required by a database manager to execute the SQL statement which is the estimated resource usage necessary to execute the access plan for the statement. Timeron cost values are derived from a combination of CPU cost (in number of instructions) and Input/Output (I/O) cost (in numbers of seeks and page transfers).

The query degree parameter 506 specifies a maximum degree of intra-partition parallelism that is used for the SQL statement executing on this instance of the database manager, wherein the SQL statement will not use more than this number of parallel operations within the database partition when the statement is executed (in this case, "1").

The illustrated access path portion 502 has a tree structure that represents dependent relationships of the operations relative to each other in carrying out the command from the start of execution of the displayed access plan up to and including the execution of that particular operator. Each of the operations are listed with different respective timeron cost values for given amounts and/or type of cloud resources that are necessary to most efficiently execute the associated operation and that are reflected in the overall cumulative cost value 504. More particularly, each of a plurality of different DB2 operator steps (operations) are performed in carrying out the SQL input command: a base nested loop join ("NLJOIN") 508, a first table scan ("TBSCAN") 510, a sort ("SORT") 512, a group-by ("GRPBY") 514 and another, second table scan ("TBSCAN") 516.

A key statement column 511 identifies the respective cost and other statistics of execution shown with each of the operator steps 508, 510, 512, 514 and 516 that are depicted there below. Thus, the top item "Rows" 501 quantifies an amount of usage of rows of the database by each operator. The next (second from top) item "RETURN" 503 identifies the DB2 operator of the step. The next (third from top) numeric value within the parenthetical notation item "(1)" 505 indicates the precedential order that respective operator steps are executed in, relative to all of the other operator steps. The next (fourth from top) item "Cost" 507 indicates a portion of the total cost that this particular operator step is responsible for; and the bottom item (fifth from top) "I/O" 509 quantifies an amount of input/output resources used.

Accordingly, in this example the base nested loop join ("NLJOIN") 508 has a cost of 27.5117, is the first or base operator step performed as indicated by the value of "(2)" (wherein the key 511 has the lowest other possible value of "(1)"), and executes upon 2.64198 units of database rows via 4.03704 I/O units.

Referring again to FIG. 4, at 104 the overall cost (504 of FIG. 5) determined at 102 to execute the SQL statement is compared to an upper threshold cost value for execution of the SQL statement input 101. If the cost is lower than the threshold, then there is no need to change the cloud resources specified for execution of any of the operator steps 504, 508, 510 512, 514 or 516 to improve efficiencies, and the process of FIG. 4 ends at 106.

However, if said total cost is above the threshold range, then further analysis is performed at 108 to identify which one or more of the access path operator steps (504, 508, 510 512, 514 or 516, of FIG. 5) have costs or function statistics that are higher or different than expected for the respective operator (for example, above expected thresholds for the identified operator, or having costs or I/O usage values more than a specified percentage above those of other operator steps listed in the access path, etc.). At 110 one or more appropriate adjustments are made in amount, type or speed of cloud resources CPU, memory, or storage that are associated with the identified operator(s), to thereby reduce the cost or revise a function statistics of the identified operation(s). This process is then iteratively repeated at 102, so that operator steps with current high costs are identified at 108 and adjustments are made in amount, type or speed of cloud resources appropriate for said identified operator at 110, until the total cost falls below the threshold at 104.

For example, in response to identification that a sort, merge, aggregation or other similar database operation has a high cost at 108, at 110 an in-place memory or a storage device amount of a cloud resource specified in generating the access path at 102 is increased, in order to speed up the sort, merge, aggregation or similar operation, and thereby lower the timeron cost indicated for the operation in a subsequent iteration of generating the access path at 102. In response to identification of a table scan operation as having a high relative cost at 108, at 110 a larger buffer pool may be allocated within the specified cloud resources, to allow for I/O device(s) to read larger page sizes and thereby lower the associated table scan timeron costs in a subsequent iteration of generating the access path at 102.

I/O sorts on different high-speed storage or low-speed storage devices will have different speeds of performance (for example solid-state memory versus a spinning hard disk), and therefore changing the type of I/O device allocated to run a particular operator step at 110 may result in different (higher or lower) timeron cost values for the associated operator. In response to determining at 108 that overall I/O calculation statistics 509, or those associated with one or more of the operator steps, are relatively high or over a threshold value, a request may be initiated to an appropriate ETL program to increase a specified number of CPUs available to a database manager. In response to determining at 108 that overall row statistics 501, or those associated with one or more of the operator steps, are relatively high or over a threshold value, heap storage may be increased at 110 to allow for additional buffering.

The example of FIG. 5 is only a portion of an access path (it omits operator steps "(5)" and "(6)"), and is also illustrative but not exhaustive, as database managers may specify or provide different access path cost and statistical outputs from optimizers at 102. However, all optimizers generally return a relative cost for an entire operation, and relative costs for each step of the data extraction, which are amenable to comparison to thresholds at 104 and 108 to iteratively change ETL allocations at 110 in order to reduce overall execution costs until they meet the specified total cost threshold at 104.

Figure 6:
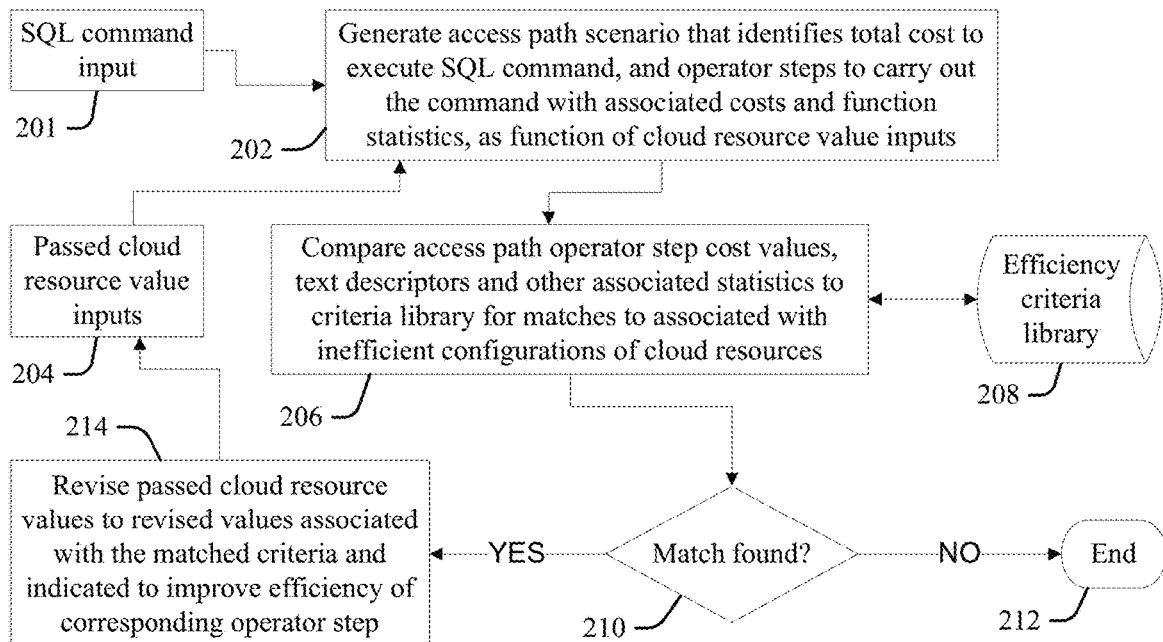
FIG. 6 is a flow chart illustration of a method or process according to another aspect of the present invention for the automated provisioning of cloud resources for ETL job execution.

FIG. 6 illustrates another computer implemented method or process of an aspect of the present invention for automated resource management in an ETL cloud environment as a function of optimizer output data, wherein a database manager is enhanced to allow for simulations. In contrast to generating an access path as a function of specified available cloud resources described in the embodiment of FIG. 4 (at 102), an optimizer at 202 generates (in response to a SQL command input 201 for a relational database ETL job) an access path scenario that identifies an overall cost, and a plurality of operator database operator steps or commands with respective associated cost and other statistics, as a function of an input 204 of values of different cloud resources (amount, type or speed of cloud resources CPU, memory, or storage, etc.) that are passed to the optimizer.

At 206 the cost values, text descriptors and other associated statistics of the access path operator steps are compared for matches to criteria within a knowledge base library 208 that are associated with inefficient configurations of cloud resources (as to the amount, type or speed of cloud resources CPU, memory, or storage, etc.). If no matches are found at 210, then the process ends at 212.

If a criteria match is found at 210, then current values of the different cloud resources passed at 214 are revised in amount, type or other value to revised values that are associated with the matched criteria and indicated to improve efficiency of a corresponding operator step (lower its cost or other use statistic attribute). At 204 the revised/adjusted values 204 are then used to generate a new access path scenario at 202. This process iteratively repeats until no more criteria matches are found at 210.

Thus, in the embodiment of FIG. 6 a database manager optimizer does not consider resources available to the system, but instead different values that are passed to it at 204. The ETL program is configured to allow for the resources that a development team notes are configurable. For example, revisions to values passed at 204 may increase storage volume and CPU numbers relative to a previous scenario iteration, but not change the type of storage available to the system. Via the iterative query at 210 an ETL program manager may pass multiple permutations to the database optimizer to find better or best combinations of resource values.

The comparison process at 206 considers the cost values, text descriptors and other associated statistics of the access path operator steps to identify and determine needs in terms of CPU numbers, memory, data storage (space) and I/O needs. For steps that require software processing, such as DB2, the process at 206 may use the output from utilities such as the DB2 Explain Plan to determine the needs of the job step.

Matching values at 206 may include recognizing (interpreting) text values of the operator step text statements as a function of the context of the operator to recognize a match to an opportunity to reduce costs associated with the operator. For example, text analysis at 206 that determines the access plan includes a "sort" operation on a "Table C" on an ETL storage resource that is subsequent to another sort operation on a "Table B" on ETL memory resources that match a determination recognition within the library 208 that the passed ETL values do not provide enough memory space to perform the second sort on Table C. This results in a revision to the passed values at 214 to increase the memory space, which should result in a next access plan scenario generated in response to this revision at 202 that Table C is now sorted elsewhere, such as in memory, or a different storage area or buffer.

Job descriptors within the access path operator steps text descriptors may also be considered and matched (via textual analysis) to a file names or other values within the knowledge base library 208 that are associated with a file size, to additionally enable determination and recognition of variable input, such as size of incoming datasets. Job descriptor analysis is a qualitative measure, a textual analysis of machine readable metadata of text string or bounds to use, that may be used to select appropriate algorithms as a function of the associated file or data size that matches to the job descriptor text. For example, recognition that the name of the file that includes the data to be sorted is "District X employee directory," as a function of specifications wherein the upper limit on numbers of employees within any "district" of the relevant organization necessary limit the size of the file to a small size relative to ETL resources, may result in choosing an algorithm for sorting the District X directory in the values passed at 204 that is efficient in cost and appropriate to small files; recognition of correlation of the job description to a known large file may instead result in choosing an algorithm for sorting a file in values passed at 204 that is much faster and more powerful, achieving lowered costs through time savings, in spite of requiring more CPU's. Other data characteristics may also be considered, for example text data indications that the data is already close to sorted may indicate an efficient algorithm for small files even if the file is known to be large.

In one example an ETL environment runs three programs (A, B and C) sequentially, wherein each is an independent job with imbedded SQL calls. While the job stream is being prepared for execution, the ETL program passes the SQL code to a database optimizer which returns (at 202, FIG. 6) how the database manager will execute read, join and sort operator steps. Based on comparison of the optimizer access path output to a knowledge base provided within or defined by the efficiency criteria library 208, the ETL program determines at 206 whether a sort will be done on storage or memory, and at 214, in response to a determination that it will be done on storage, increases an amount of direct-access storage device (DASD) available for job B and allocates it to an appropriate buffer pool. In this scenario the matching analysis determines that storage is needed for a specific buffer pool, and accordingly the ETL program first requests the additional storage from a cloud provider and then allocates it through the database manager to that buffer pool.

Figure 7:
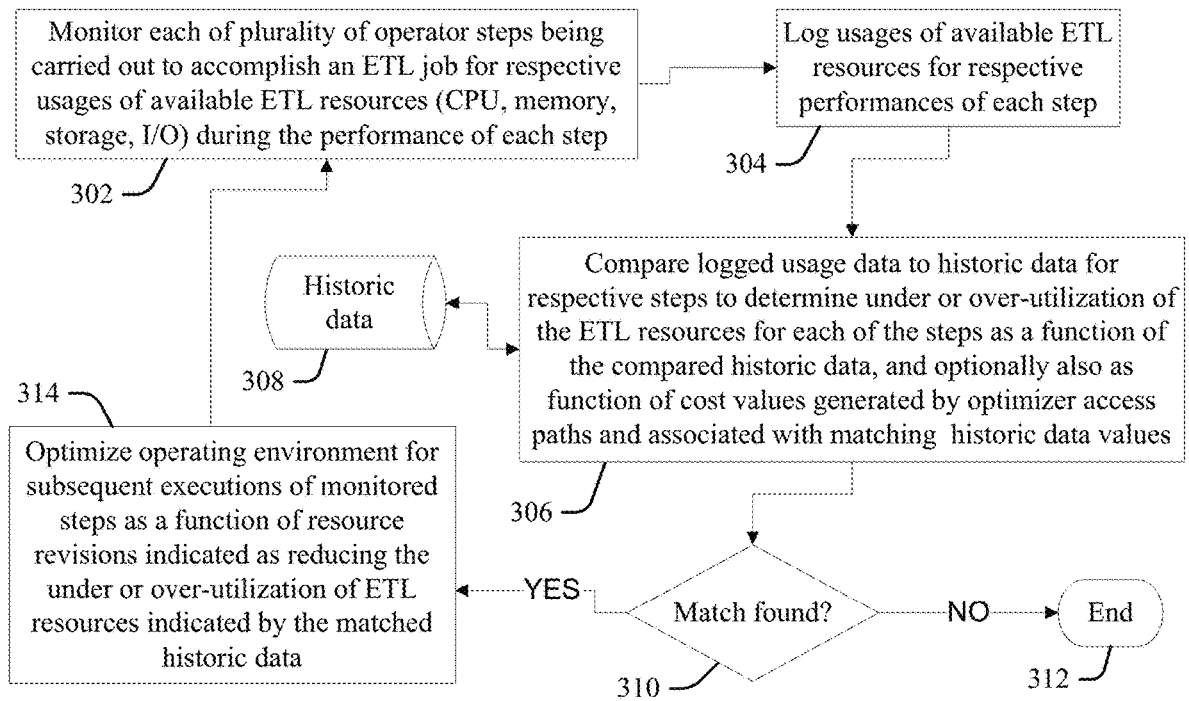
FIG. 7 is a flow chart illustration of a method or process according to another aspect of the present invention for the automated provisioning of cloud resources for ETL job execution.

FIG. 7 illustrates another aspect of the present invention that is appropriate for situations wherein a database manager optimizer structure has no previous access to an SQL job executed on the ETL resources. Each of a plurality of operator steps carried out to accomplish an ETL job are monitored at 302 for their respective usages of available ETL resources (CPU, memory, storage, I/O) during the performance of each of said ETL operator job steps. The respective usage data is recorded (logged) at 304 in association with the respective ones of the steps that generate the usage data. Illustrative but not limiting or exhaustive examples of resources that would be monitored and recorded are CPU usage, memory on a server, storage pools and I/O rates.

At 306 the stored ETL resource usage data is compared to historic data 308 for similar (matching) steps to determine under or over-utilization of the ETL resources for each of the steps as a function of differences in values of the compared data. The determination of under- or over-utilization may be a function of cost values associated with historic data values generated by optimizer access paths, as well as of text descriptors and other associated statistics of access path operator steps.

If no matches to data indicative of under- or over-utilization of ETL resources are found at 310 for any of the steps from the comparisons at 306, then the process is ended at 312.

Otherwise, the operating environment is optimized at 314 for subsequent executions (at 302) of the monitored steps as a function of resource revisions indicated as reducing the under- or over-utilization of ETL resources that are indicated by the matched historic data, thereby optimizing the overall execution environment provisioned for the ETL for subsequent executions of the steps. This process may be iterative, adjusting the environment for each of the execution steps in response to determining respective under- or over-utilizations of ETL resources, until no further matches indicative of under- or over-utilizations are found at 310.

More particularly, the information from every step of every job logged at 306 is useful in determining if the resources are too low and are being over-utilized. For example, determining that a CPU is operating at its maximum capacity (is pegged) indicates that allocating an additional CPU may decrease overall costs in executing the SQL job, via decreasing processing time. Determining that an allocated CPU is being used at a minimal or low amount may indicate that too many CPU's are allocated and being under-utilized, resulting in minimal processing loads for the CPU's, which indicates that some of the allocated CPU's may be dropped without negatively impacting (increasing) processing time, and thereby resulting in a lower overall cost value for the same time performance in response to the use of fewer CPU's.

In some aspects, logged data volumes and estimated relative costs from an optimizer are used to tune the ETL resources based on volumes at 306. For example, in a low volume execution of "Job A" logged at 306 an optimizer returns a relative cost of 12, wherein a server executing the Job A only required 1 CPU. However, in a subsequent run, the optimizer returns a relative cost value of 100, which is correlated with historic data that shows this cost generally requires 4 CPUs for optimal performance, and accordingly the operating environment for Job A is revised at 314 to allocate 4 CPU's for the job in subsequent executions of said operator step.

Aspects according to the example of FIG. 7 expand the capabilities of the ETL program and database manager wherein historical information is stored to further tune the amount of resources that are needed, including the timing of the resource increases or decreases based on the created log files. In one example, comparison of log files created at 304 to historic data 308 at 306 determines that history shows that CPU utilization is high for the first 15 minutes of a one-hour job, but that CPU utilization is lower over the last 45 minutes (as heavier processing has completed). Accordingly, the environment is optimized at 314 to allocate fewer CPU's from ETL cloud resources during the last 45 minutes of the job during future iterations of the job.

Database optimizers with capabilities expanded according to aspects of the present invention may run and compare multiple access path iterations (for example, at 102, 202 or 306) with different amounts of memory or storage, and then responsively allocate resources based on comparing the outputs of the different ETL environment settings. For example, an ETL program may run two simulation scenarios, the first scenario with 1 gigabyte (GB) memory and the second scenario with 4 GB. If the optimizer determines a same relative total cost for the same SQL statement input for both simulations, then only 1 GB is required and the environment values are set accordingly (at 110, 214 or 314). However, if the optimizer determines a lower, improved cost with 4 GB of memory relative to the 1 GB memory, then the additional memory would be allocated by the values passed or revised, since the lower cost value indicates that this configuration is more efficient, even though it requires more memory.

Aspects of the present invention ensure that cloud environment scenarios are provisioned with the optimal capabilities for an ETL job step execution. This could include passing values to allocate just a single environment for execution of an SQL command, or environments that are best-tuned for each step in the ETL job. ETL values passed to a database manager may also specify different sources, for rather than using increased or decreased amounts of memory from the cloud, values passed (at 110, 214/204 or 314) may choose between different, dedicated or fixed server resources that are not provided by the cloud or otherwise shared with other applications or users.

Aspects may also be practiced in non-ETL batch streams, and extended to any processing request against a database manager, for example, to a COBOL ("COmmon Business-Oriented Language") or other program or application.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for the automated provisioning of cloud resources for extract, transform and load job execution as a function of logged data, the method comprising executing on a computer processor:

monitoring each of a plurality of operator steps carried out to accomplish a structured English query language command job for their respective usages of available extract, transform and load cloud resources during the performance of each of said operator job steps, wherein the available cloud resources are selected from the group consisting of central processing unit, memory, storage and input/output device resources;

logging the respective usage data in association with respective ones of the operator steps that generate the usage data;

comparing the logged usage data to historic data for matching steps to determine under-utilization or over-utilization of the cloud resources for each of the steps as a function of amounts of differences in values of the compared data relative to the historic data for the matching steps, comprising: determining the over-utilization of the cloud resources in response to determining that a first central processing unit of a plurality of central processing units is operating at its maximum capacity in executing a first of the monitored steps, and determining the under-utilization of the cloud resources in response to determining that a second central processing unit of the plurality of central processing units is operating at a minimal load in executing a second of the monitored steps; and optimizing an operating environment for subsequent executions of the monitored plurality of operator steps by adjusting a value selected from the group consisting of amount, type or speed, with respect to central processing units, memories or storage devices of cloud resources that are associated with the operator steps to correspondingly reduce the amounts of differences in values of the compared data relative to the historic data for the matching steps, the optimizing comprising:

allocating an additional central processing unit for the subsequent executions of the first monitored step in response to the determining that the first central processing unit is operating at its maximum capacity in executing the first monitored step; and dropping an allocation of the second central processing unit for the subsequent executions of the second monitored step in response to the determining that the second central processing unit is operating at the minimal load in executing the second monitored step.

2. The method of claim 1, wherein the comparing the logged usage data to the historic data determines that the historic data of a step that matches to a third one of the monitored steps indicates that central processing unit utilization is high for a first period of a total amount of time required to accomplish the structured English query language command job, and low for a second period of the total amount of time required to accomplish the structured English query language command job that is different from the first period of time; and wherein the optimizing the operating environment for subsequent executions of the optimized step comprises allocating fewer central processing units from cloud resources for use during the second period relative to a number of central processing units allocated for use during the first period.

3. The method of claim 1, further comprising:

integrating computer-readable program code into a computer system comprising the processor, a computer readable memory in circuit communication with the processor, and a computer readable storage medium in circuit communication with the processor; and wherein the processor executes program code instructions stored on the computer-readable storage medium via the computer readable memory and thereby performs the monitoring each of the operator steps carried out to accomplish the structured English query language command job for their respective usages of available cloud resources during the performance of each of said operator job steps, the logging the respective usage data in association with respective ones of the operator steps that generate the usage data, the comparing the logged usage data to the historic data for the matching steps to determine the under-utilization or the over-utilization of the cloud resources for each of the steps as the function of amounts of differences in values of the compared data relative to the historic data for the matching steps, and the optimizing the operating environment for subsequent executions of the monitored plurality of operator steps by adjusting the amount, type or speed of the central processing units, memories or storage devices of cloud resources that are associated with the operator steps to correspondingly reduce the amounts of differences in values of the compared data relative to the historic data for the matching steps.

4. The method of claim 3, further comprising:
providing the integrated computer-readable program code as a service in a cloud environment.

5. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
monitors each of a plurality of operator steps carried out to accomplish a structured English query language command job for their respective usages of available extract, transform and load cloud resources during the performance of each of said operator job steps, wherein the available cloud resources are selected from the group consisting of central processing unit, memory, storage and input/output device resources;
logs the respective usage data in association with respective ones of the operator steps that generate the usage data;
compares the logged usage data to historic data for matching steps to determine under-utilization or over-utilization of the cloud resources for each of the steps as a function of amounts of differences in values of the compared data relative to the historic data for the matching steps, comprising determining the over-utilization of the cloud resources in response to determining that a first central processing unit of a plurality of central processing units is operating at its maximum capacity in executing a first of the monitored steps, and determining the under-utilization of the cloud resources in response to determining that a second central processing unit of the plurality of central processing units is operating at a minimal load in executing a second of the monitored steps; and optimizes an operating environment for subsequent executions of the monitored plurality of operator steps by adjusting a value selected from the group consisting of amount, type or speed, with respect to central processing units, memories or storage devices of cloud resources that are associated with the operator steps to correspondingly reduce the amounts of differences in values of the compared data relative to the historic data for the matching steps, by:

allocating an additional central processing unit for the subsequent executions of the first monitored step in response to the determining that the first central processing unit is operating at its maximum capacity in executing the first monitored step; and dropping an allocation of the second central processing unit for the subsequent executions of the second monitored step in response to the determining that the second central processing unit is operating at the minimal load in executing the second monitored step.

6. The system of claim 5, wherein the processor executes the program instructions stored on the computer-readable storage medium via the computer readable memory and thereby:
compares the logged usage data to the historic data;
determines that the historic data of a step that matches to a third one of the monitored steps indicates that central processing unit utilization is high for a first period of a total amount of time required to accomplish the structured English query language command job, and low for a second period of the total amount of time required to accomplish the structured English query language command job that is different from the first period of time; and
optimizes the operating environment for subsequent executions of the optimized step by allocating fewer central processing units from cloud resources for use during the second period relative to a number of central processing units allocated for use during the first period.

7. The system of claim 5, wherein the program instructions are provided as a service in a cloud environment.

8. A computer program product for the automated provisioning of cloud resources for extract, transform and load job execution as a function of logged data, the computer program product comprising:
a computer readable storage medium having computer readable program code embodied therewith, wherein the computer readable storage medium is not a transitory signal per se, the computer readable program code comprising instructions for execution by a processor that cause the processor to:
monitor each of a plurality of operator steps carried out to accomplish a structured English query language command job for their respective usages of available extract, transform and load cloud resources during the performance of each of said operator job steps, wherein the available cloud resources are selected from the group consisting of central processing unit, memory, storage and input/output device resources;
log the respective usage data in association with respective ones of the operator steps that generate the usage data;
compare the logged usage data to historic data for matching steps to determine under-utilization or over-utilization of the cloud resources for each of the steps as a function of amounts of differences in values of the compared data relative to the historic data for the matching steps, comprising determining the over-utilization of the cloud resources in response to determining that a first central processing unit of a plurality of central processing units is operating at its maximum capacity in executing a first of the monitored steps, and determining the under-utilization of the cloud resources in response to determining that a second central processing unit of the plurality of central processing units is operating at a minimal load in executing a second of the monitored steps; and
optimize an operating environment for subsequent executions of the monitored plurality of operator steps by adjusting a value selected from the group consisting of amount, type or speed, with respect to central processing units, memories or storage devices of cloud resources that are associated with the operator steps to correspondingly reduce the amounts of differences in values of the compared data relative to the historic data for the matching steps, by:
allocating an additional central processing unit for the subsequent executions of the first monitored step in response to the determining that the first central processing unit is operating at its maximum capacity in executing the first monitored step; and
dropping an allocation of the second central processing unit for the subsequent executions of the second monitored step in response to the determining that the second central processing unit is operating at the minimal load in executing the second monitored step.

9. The computer program product of claim 8, wherein the computer readable program code instructions for execution by the processor further cause the processor to:
compare the logged usage data to the historic data;
determine that the historic data of a step that matches to a third one of the monitored steps indicates that central processing unit utilization is high for a first period of a total amount of time required to accomplish the structured English query language command job, and low for a second period of the total amount of time required to accomplish the structured English query language command job that is different from the first period of time; and
optimize the operating environment for subsequent executions of the optimized step by allocating fewer central processing units from cloud resources for use during the second period relative to a number of central processing units allocated for use during the first period.

10. The computer program product of claim 8, wherein the program instructions are provided as a service in a cloud environment.

11. The method of claim 1, wherein the comparing the logged usage data to the historic data comprises determining each of a plurality of step costs, one for each of the operator steps, as a combination of amounts of instructions, seeks and page transfers generated by a central processing unit in executing an associated database operator command of each step;
wherein the optimizing the operating environment for the subsequent executions of the monitored plurality of operator steps comprises allocating a specific quantity of central processing units for the subsequent executions of a fourth of the steps in response to determining that the step cost determined for the fourth operator step is correlated in the historic data to the specific quantity of central processing units for an optimal execution performance of the fourth step; and
wherein the operator steps are selected from the group consisting of a base nested loop join, a table, a sort, a merge, an aggregation and a group-by.

12. The system of claim 5, wherein the processor executes the program instructions stored on the computer-readable storage medium via the computer readable memory and thereby:
compares the logged usage data to the historic data by determining each of a plurality of step costs, one for each of the operator steps, as a combination of amounts of instructions, seeks and page transfers generated by a central processing unit in executing an associated database operator command of each step; and optimizes the operating environment for the subsequent executions of the monitored plurality of operator steps by allocating a specific quantity of central processing units for the subsequent executions of a fourth of the steps in response to determining that the step cost determined for the fourth operator step is correlated in the historic data to the specific quantity of central processing units for an optimal execution performance of the fourth step; and wherein the operator steps are selected from the group consisting of a base nested loop join, a table, a sort, a merge, an aggregation and a group-by.

13. The computer program product of claim 8, wherein the computer readable program code instructions for execution by the processor further cause the processor to:

compare the logged usage data to the historic data by determining each of a plurality of step costs, one for each of the operator steps, as a combination of amounts of instructions, seeks and page transfers generated by a central processing unit in executing an associated database operator command of each step; and optimize the operating environment for the subsequent executions of the monitored plurality of operator steps by allocating a specific quantity of central processing units for the subsequent executions of a fourth of the steps in response to determining that the step cost determined for the fourth operator step is correlated in the historic data to the specific quantity of central processing units for an optimal execution performance of the fourth step; and wherein the operator steps are selected from the group consisting of a base nested loop join, a table, a sort, a merge, an aggregation and a group-by.

* * * * *